United States Patent
Lopez et al.

(10) Patent No.: US 7,967,206 B2
(45) Date of Patent: Jun. 28, 2011

(54) FUNCTIONAL AIMING SYSTEM FOR AN AUTOMATIC DATA COLLECTION DEVICE, SUCH AS AN IMAGE ACQUISITION DEVICE

(75) Inventors: Christophe Lopez, St-Orens de Gameville (FR); Vincent Bessettes, Toulouse (FR); Pierre Cabrera, Toulouse (FR); Mustapha Krichi, Castelnau d'estretefonds (FR); Philippe Lac, Labarthe sur Leze (FR); Pierre-Marie Manine, Colomiers (FR); Jean-Michel Puech, Toulouse (FR); Bernard Serres, Dremil Lafage (FR); Serge Thuries, Saint Jean (FR); Michael W. Dant, Cedar Rapids, IA (US); H. Sprague Ackley, Everett, WA (US)

(73) Assignee: Intermec IP Corp., Everett, WA (US)

( * ) Notice: Subject to any disclaimer, the term of this patent is extended or adjusted under 35 U.S.C. 154(b) by 1321 days.

(21) Appl. No.: 11/465,222

(22) Filed: Aug. 17, 2006

(65) Prior Publication Data

US 2007/0084926 A1    Apr. 19, 2007

Related U.S. Application Data

(60) Provisional application No. 60/709,709, filed on Aug. 18, 2005.

(51) Int. Cl.
*G06K 7/14* (2006.01)
(52) U.S. Cl. .................. 235/454; 235/462.2; 235/462.11
(58) Field of Classification Search ............ 235/462.01–235/462.49, 454
See application file for complete search history.

(56) References Cited

U.S. PATENT DOCUMENTS

| | | | |
|---|---|---|---|
| 4,820,911 A | | 4/1989 | Arackellian et al. |
| 4,933,538 A | * | 6/1990 | Heiman et al. ........... 235/462.31 |
| 4,988,852 A | | 1/1991 | Krishnan |
| 5,378,883 A | | 1/1995 | Batterman et al. |
| 5,550,364 A | | 8/1996 | Rudeen |
| 5,561,283 A | * | 10/1996 | Dvorkis et al. .......... 235/462.09 |
| 5,608,202 A | * | 3/1997 | Bridgelall et al. ....... 235/462.06 |
| 5,627,360 A | | 5/1997 | Rudeen |
| 5,640,001 A | | 6/1997 | Danielson et al. |
| 5,690,418 A | | 11/1997 | Hsiung |
| 5,734,153 A | | 3/1998 | Swartz et al. |
| 5,756,981 A | | 5/1998 | Roustaei et al. |
| 5,770,841 A | | 6/1998 | Moed et al. |
| 5,880,451 A | | 3/1999 | Smith et al. |
| 6,003,775 A | | 12/1999 | Ackley |
| RE36,528 E | * | 1/2000 | Roustaei .................. 235/472.01 |

(Continued)

OTHER PUBLICATIONS

U.S. Appl. No. 11/141,251, filed May 31, 2005. Inventor: Michael Dant.

(Continued)

*Primary Examiner* — Jamara A Franklin
(74) *Attorney, Agent, or Firm* — Seed IP Law Group PLLC

(57) ABSTRACT

An automatic data collection device is provided for reading barcodes, matrix codes, stacked codes, or other machine-readable symbol. The data collection device generates an aiming beam that serves a dual purpose of target locating and data acquisition, such as data acquisition using imaging methods. The aiming beam defines the field of view of the data collection device for imaging. The illumination pattern provided by the aiming beam for imaging can have its shape, size, and/or intensity adaptively changed depending on conditions.

24 Claims, 6 Drawing Sheets

U.S. PATENT DOCUMENTS

| | | | |
|---|---|---|---|
| 6,060,722 A | 5/2000 | Havens et al. | |
| 6,095,422 A | 8/2000 | Ogami | |
| 6,138,915 A | 10/2000 | Danielson et al. | |
| 6,216,950 B1 | 4/2001 | Ohkawa et al. | |
| 6,223,988 B1 | 5/2001 | Batterman et al. | |
| 6,330,974 B1 | 12/2001 | Ackley | |
| 6,332,577 B1 | 12/2001 | Acosta et al. | |
| 6,340,114 B1 | 1/2002 | Correa et al. | |
| 6,398,112 B1 | 6/2002 | Li et al. | |
| 6,417,840 B1 | 7/2002 | Daniels | |
| 6,491,223 B1 | 12/2002 | Longacre, Jr. et al. | |
| 6,572,019 B1 | 6/2003 | Rando et al. | |
| 6,641,042 B1 | 11/2003 | Pierenkemper et al. | |
| 6,641,046 B2 | 11/2003 | Durbin | |
| 6,659,350 B2 | 12/2003 | Schwartz et al. | |
| 6,708,883 B2 | 3/2004 | Krichever | |
| 6,729,546 B2 | 5/2004 | Roustaei | |
| 7,090,137 B1 | 8/2006 | Bennett | |
| 7,121,469 B2 | 10/2006 | Dorai et al. | |
| 2002/0054433 A1 | 5/2002 | Tacklind et al. | |
| 2002/0131139 A1 | 9/2002 | Madella et al. | |
| 2002/0148900 A1* | 10/2002 | Gurevich et al. | 235/462.34 |
| 2004/0099741 A1 | 5/2004 | Dorai et al. | |
| 2004/0206823 A1 | 10/2004 | Blake et al. | |
| 2005/0001035 A1* | 1/2005 | Hawley et al. | 235/462.21 |
| 2005/0274806 A1 | 12/2005 | Dant | |
| 2006/0097053 A1 | 5/2006 | Jolivet et al. | |
| 2007/0040012 A1 | 2/2007 | Lin et al. | |
| 2007/0164112 A1 | 7/2007 | Dant | |

OTHER PUBLICATIONS

U.S. Appl. No. 11/149,452, filed Jun. 8, 2005. Inventors: Jolivet et al.
U.S. Appl. No. 11/280,955, filed Nov. 16, 2005. Inventor: Thuries.
U.S. Appl. No. 11/436,123, filed May 16, 2006. Inventors: Ray et al.
U.S. Appl. No. 11/619,888, filed Jan. 4, 2007. Inventor: Michael Dant.
Intermec Technologies Corp., "1470/1471 Imager—User's Manual," P/N 067054-003, pp. 1-9, 3-21 to 3-36, 2001.

* cited by examiner

FUNCTIONAL AIMING SYSTEM FOR AN AUTOMATIC DATA COLLECTION DEVICE, SUCH AS AN IMAGE ACQUISITION DEVICE

CROSS-REFERENCE TO RELATED APPLICATION

The present application claims the benefit and priority under 35 U.S.C. §119(e) of U.S. Provisional Patent Application Ser. No. 60/709,709, entitled "FUNCTIONAL AIMING SYSTEM FOR An automatic DATA COLLECTION DEVICE, SUCH AS AN IMAGE ACQUISITION DEVICE," filed Aug. 18, 2005, assigned to the same assignee as the present application, and incorporated herein by reference in its entirety.

TECHNICAL FIELD

The present disclosure relates generally to electronic devices for reading data carriers, such as machine-readable symbols (e.g., matrix codes, barcodes, stacked codes, and the like), and more particularly but not exclusively, relates to techniques to use an aiming beam of a data collection device.

BACKGROUND INFORMATION

The automatic data collection (ADC) arts include numerous systems for representing information in machine-readable form. For example, a variety of symbologies exist for representing information in barcode symbols, matrix or area code symbols, and/or stacked symbols. A symbology typically refers to a set of machine-readable symbol characters, some of which are mapped to a set of human-recognizable symbols such as alphabetic characters and/or numeric values. Machine-readable symbols are typically composed of machine-readable symbol characters selected from the particular symbology to encode information. Machine-readable symbols typically encode information about an object on which the machine-readable symbol is printed, etched, carried or attached to, for example, via packaging or a tag.

Barcode symbols are a common one-dimensional (1D) form of machine-readable symbols. Barcode symbols typically comprise a pattern of vertical bars of various widths separated by spaces of various widths, with information encoded in the relative thickness of the bars and/or spaces, each of which have different light reflecting properties. One-dimensional barcode symbols require a relatively large space to convey a small amount of data.

Two-dimensional symbologies have been developed to increase the data density of machine-readable symbols. Some examples of two-dimensional symbologies include stacked code symbologies. Stacked code symbologies may be employed where length limitations undesirably limit the amount of information in the machine-readable symbol. Stacked code symbols typically employ several lines of vertically stacked one-dimensional symbols. The increase in information density is realized by reducing or eliminating the space that would typically be required between individual barcode symbols.

Some other examples of two-dimensional symbologies include matrix or area code symbologies (hereinafter matrix code). A matrix code machine-readable symbol typically has a two-dimensional perimeter, and comprises a number of geometric elements distributed in a pattern within the perimeter. The perimeter may, for example, be generally square, rectangular or round. The geometric elements may, for example, be square, round, or polygonal, for example hexagonal. The two-dimensional nature of such a machine-readable symbol allows more information to be encoded in a given area than a one-dimensional barcode symbol.

The various above-described machine-readable symbols may or may not also employ color to increase information density.

A variety of machine-readable symbol readers for reading machine-readable symbols are known. Machine-readable symbol readers typically employ one of two fundamental approaches, scanning or imaging.

In scanning, a focused beam of light is scanned across the machine-readable symbol, and light returned from and modulated by the machine-readable symbol is received by the reader and demodulated. With some readers, the machine-readable symbol is moved past the reader, with other readers the reader is moved past the machine-readable symbol, and still other readers move the beam of light across the machine-readable symbol while the reader and machine-readable symbol remain approximately fixed. Demodulation typically includes an analog-to-digital conversion and a decoding of the resulting digital signal.

Scanning type machine-readable symbol readers typically employ a source of coherent light such as a laser diode to produce a beam, and employ a beam deflection system such as an rotating or oscillating mirror to scan the resulting beam across the machine-readable symbols.

In imaging, the machine-readable symbol reader may flood the machine-readable symbol with light, or may rely on ambient lighting. A one-dimensional (linear) or two-dimensional image (2D) capture device or imager such as a charge coupled device (CCD) or APS array captures a digital image of the illuminated machine-readable symbol, typically by electronically sampling or scanning the pixels of the linear or two-dimensional image capture device. The captured image is then decoded, typically without the need to perform an analog to digital conversion.

A two-dimensional machine-readable symbol reader system may convert, for example, two-dimensional symbols into pixels. See, for example, U.S. Pat. No. 4,988,852 issued to Krishnan, U.S. Pat. No. 5,378,883 issued to Batterman, et al., U.S. Pat. No. 6,330,974 issued to Ackley, U.S. Pat. No. 6,484,944 issued to Manine, et al., and U.S. Pat. No. 6,732,930 issued to Massieu, et al.

Regardless the type of symbology used, their usefulness is often limited by the capability of a data collection device (such as a matrix code reader, barcode reader, stacked code reader, and the like) to accurately capture the data encoded in the machine-readable symbol. Optical data collection devices are directional in nature—such devices need to be optimally positioned in order to accurately read the data on the symbol. If the data collection device is pointed too far askew to the symbol, for example, then the data may not be read or may be read incorrectly. The inability of an inexperienced user to skillfully position the data collection device also contributes to the directional limitations of such devices, thereby further increasing the chances of erroneous or missed data readings.

Furthermore in many situations, the acquisition beam (e.g., the scanning beam in the context of a scanner type symbol reader, the flood illumination beam in the context of an imager type symbol reader, or other light beam that is output by the data collection device to read the target symbol) from the data collection device may be invisible or have low-visibility. The invisibility or low-visibility of the acquisition beam adversely affects the user's ability to determine whether the data collection device is optimally positioned at a target. This drawback becomes quite apparent in a situation where the user has to specifically locate and accurately read a particular individual symbol positioned among several different symbols that are clustered near one another, such as when large quantities of inventory are stacked on a shelf. In such a situation, the user needs to carefully operate the data collection device to ensure that the desired symbol (rather than an adjacent symbol) is being read.

To assist the user, many data collection devices use an aiming beam (sometimes referred to as a "spotter beam") in addition to the acquisition beam. For example with imager type symbol readers, the aiming beam can be a plurality of light beams (such as laser light) that provide one or more spots, boxes, crossing dots, or some other 2D pattern, so as to assist the user in roughly identifying the intended target area. The aiming beam is typically provided by way of a separate electronic circuit and/or by an electronic circuit that outputs a flashing light having a fixed frequency. Once the aiming beam has identified the target area for the user, the user can activate the acquisition beam to read the symbol. Typically with matrix code readers or other imager type symbol readers, the aiming beam is deactivated prior to data acquisition (e.g., image acquisition), so as to avoid interfering with the target image.

Existing data collection devices use the aiming beam for the narrow purpose of defining or otherwise identifying the target area, and as stated above for matrix code readers or other imager type symbol readers, the aiming beam is extinguished prior to image acquisition. Therefore, separate illumination for imager type symbol readers is provided by way of the acquisition beam in order to sufficiently illuminate the entire target symbol to a level required for acceptable image quality.

Moreover, imager type symbol readers usually provide their own illumination in order to enhance the quality of the images being acquired. The illumination is spread evenly across the viewing area (i.e., field of view) of the device regardless of the size and quality of the target symbol itself. In certain environments, this illumination may not be sufficiently bright over the target symbol or may wash out the aiming beam of the device, thereby making it difficult for the user to aim correctly.

BRIEF SUMMARY

One aspect provides a method usable with an imager type automatic collection device having a two-dimensional field of view. The method includes producing a stationary aiming beam having a wavelength in a visible portion of an electromagnetic spectrum and having at least one dimension that corresponds to a dimension of the field of view of the imager type automatic data collection device. At least a portion of a target machine-readable symbol is illuminated with the stationary aiming beam. At least a portion of light of the aiming beam that has been returned from the illuminated area of the target symbol is received, and information modulated in the returned and received light is decoded.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1A:
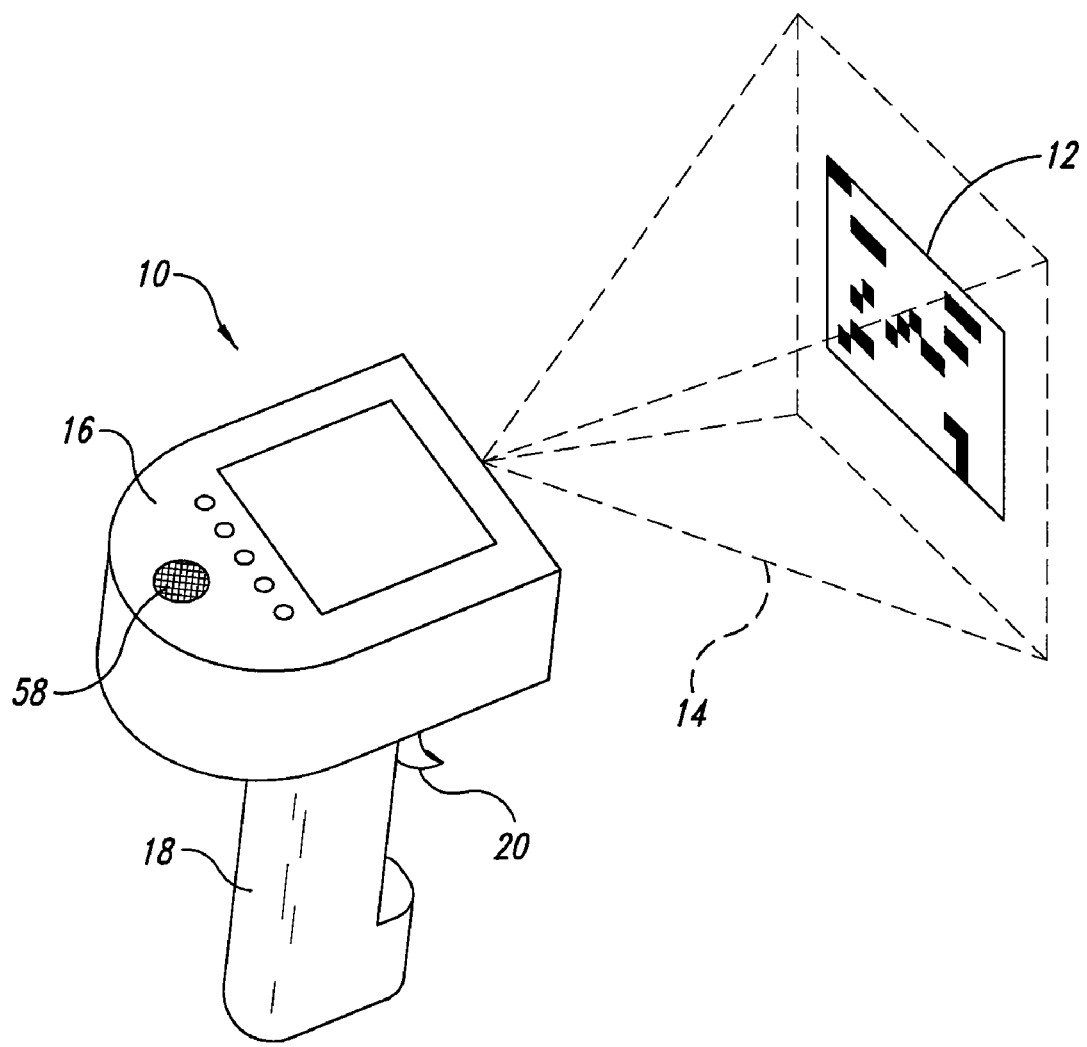
FIG. 1A is an upper isometric view of an embodiment of an automatic data collection device reading a target symbol with an aiming beam.

Embodiments of techniques to use an aiming beam for both target locating and data acquisition are described herein. In the following description, numerous specific details are given to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments As an overview, a stationary horizontal aiming beam of an embodiment defines a field of view of an automatic data collection device, such as a 2D data collection device that is usable to acquire an image of a 1D and/or 2D machine-readable symbol. The width of the horizontal aiming beam outlines the field of view of the 2D data collection device, for example, and seems more familiar and natural to users who are accustomed to using scanner type 1D data collection devices having horizontal aiming beams. In another embodiment, the aiming beam provides direct illumination for image acquisition of a 1D machine-readable symbol using the 2D data collection device. In such an embodiment, the captured image of the 1D machine-readable symbol can be decoded without using a full 2D image decode process on an image array. Thus, the 2D data collection device for 1D image acquisition has the look and feel of a 1D data collection device, yet provides a faster decoding process ("snappier performance") since only a portion of the image array needs to be processed to decode the acquired image of the 1D machine-readable symbol.

An automatic data collection device of an embodiment is provided with an aiming beam that can be used for both target locating and data acquisition. The data collection device of an embodiment comprises a handheld data collection device. In the context of 2D machine-readable symbols (such as matrix codes), the aiming beam can provide illumination in both the horizontal axis and vertical axis, so as to cover the horizontal and vertical field of views of a 2D data collection device, such as a matrix code reader or other imager device. In the context of 1D or other linear symbols, the aiming beam provides an illumination pattern having a width that corresponds to a field of view of the 2D data collection device. That is, the width of the illumination pattern substantially defines the horizontal field of view of the 2D data collection device, as well as providing an indication of alignment along a major axis of the data collection device relative to the target machine-readable symbol.

This multi-purpose aiming beam can be provided for single-mode data collection devices that can read either 1D or 2D machine-readable symbols, using imaging to read such symbols. For instance, a single-mode data collection device for reading 1D machine-readable symbols can use an aiming beam that also performs imaging. The multi-purpose aiming beam can also be provided for multi-mode data collection devices. Such multi-mode data collection devices can read both 1D and 2D machine-readable symbols (as well as possibly other types of data carriers) using an aiming beam that also performs data acquisition, using imaging. When implemented for example in a multi-mode data collection device that can illuminate and read a 1D machine-readable symbol using imaging, the aiming beam allows a simpler (e.g., not a full 2D decoding process) to be used to decode the 1D symbol. Various arrangements and types of light sources can be provided by embodiments to produce the multi-purpose aiming beam that is used to perform data acquisition using imaging.

As will be described in further detail below, one or more embodiments of an automatic data collection device that employ the multi-purpose aiming beam has at least one of the following capabilities:

flood illuminating an entire 2D machine-readable symbol with an aiming beam to acquire an image of the entire 2D symbol as illuminated by the aiming beam;

illuminating at least a portion of a 1D machine-readable symbol with constant illumination using an aiming beam, such as a horizontal aiming beam, and acquiring an image of the portion of the 1D symbol thus illuminated; and/or illuminating at least a portion of a 1D machine-readable symbol with constant illumination using an aiming beam, such as a horizontal aiming beam, having a relatively greater thickness along a vertical axis, and acquiring an image of the portion of the 1D symbol thus illuminated.

The multi-purpose aiming light of an embodiment uses a wavelength that is compatible with human visual sensitivity and with sensor requirements. Laser light and LED light are non-exhaustive examples of the types of light that may be used by embodiments.

In an embodiment, the illumination provided by the data collection device can be adapted to the specific environment of the decoding process. For example, if 1D or small 2D machine-readable symbols are to be decoded, the illumination can be focused into a narrower but brighter beam. If it is difficult for the user to see the aiming beam because there is too much ambient light (e.g., it is too bright), then the illumination can be focused into an aiming beam since the illumination is not needed in such environments. If two or more illumination sources are used, the aiming beam generated by the illumination sources could be used for visual indication of an ideal distance to the target symbol, using beam convergence for example.

FIG. 1A shows an automatic data collection device 10 for reading one or more target machine-readable symbols, such a matrix code symbol 12 or some other 2D symbol. While the matrix code symbol 12 is illustrated, it is appreciated that the symbol may be embodied as any other type of 2D symbol that can be advantageously located and read by an aiming beam, such a stacked code symbol for instance. For the sake of simplicity of explanation hereinafter and unless the context is otherwise, the various embodiments pertaining to the data collection device 10 of FIG. 1A will be described with respect to a target symbol being in the form of the matrix code symbol 12.

The data collection device 10 includes a head 16, a handle 18, and an actuator such as a trigger 20. While the trigger 20 is shown with a specific shape and in a specific location in the embodiment of FIG. 1A, other embodiments may employ different arrangements. For example, the trigger 20 can be embodied as a side-mounted finger trigger, top-mounted thumb trigger, button or key, touch screen, and other trigger arrangements. One embodiment further provides a proximity trigger, which uses optics, acoustics, or other mechanism to determine proximity of an object to automatically activate without requiring a user to pull the trigger. In one embodiment, the trigger 20 can be implemented as a multi-position trigger that can be pulled/pressed in stages. For example, an initial press (e.g., pressing the trigger 20 halfway) can be used to perform aiming and initial illumination for positioning purposes, and a further press (e.g., further pressing the trigger 20 to its fully pressed position) can be used to perform data acquisition via imaging. In yet other embodiments, image acquisition can be automatically initiated after expiration of a set time period after the data collection device has been pointed at the matrix code symbol 12, or automatically initiated after sensing a lack of movement of the data collection device 10, generally indicating that the data collection device 10 is being pointed at a desired target symbol.

The data collection device 10 can comprise a portable data collection device, a hand-held imager type device, or other suitable electronic device having the various data reading capabilities described herein. It is appreciated that some embodiments are provided that may not necessarily have the same shape or identical features or identical use as the embodiments illustrated in the various figures. However, such embodiments can nevertheless include features of a multi-purpose aiming beam 14.

The aiming beam 14 of FIG. 1A is symbolically depicted in broken lines as one or more beams of light directed at the matrix code symbol 12 and having a generally rectangular illumination pattern. It is appreciated that such illumination pattern produced by the aiming beam 14 can comprise various other shapes such as substantially square, elliptical, circular, and so forth. In an embodiment described with reference to FIG. 3, the illumination pattern produced by the aiming beam 14 is rectangular in shape having a major axis or width that defines the horizontal field of view of the data collection device 10 and having a minor axis or height (thickness) that defines the vertical field of view of the data collection device 10. While the terms "horizontal" and "vertical" are used for ease of reference in this description, such is not intended to imply any particular orientation of the symbol 12, a field of view, and/or the data collection device 10 with respect to real-world coordinates.

The aiming beam 14 allows the user to visually locate a target machine-readable symbol or to otherwise visually verify the positioning of the data collection device 10 relative to the target symbol, such as the matrix code symbol 12. Additionally, the aiming beam 14 can assist the user in determining whether the data collection device 10 is optimally positioned in terms of distance from the matrix code symbol 12 (i.e., range finding). For imaging implementations, the width and height of the illumination pattern generated by the aiming beam 14 is such that the matrix code symbol 12 is fully illuminated within the inside perimeter of the illumination pattern.

In one embodiment, the aiming beam 14 can be generated using one or more light sources that are suitably arranged to generate a desired size and shape of an illumination pattern. Examples of such light sources include laser light sources, light emitting diodes (LEDs), or other types of light sources that generate light that is visible to the user and that can be detected by a sensor. To generate a horizontally oriented linear illumination pattern, a plurality of LEDs can be arranged in a row at the data collection device 10, such that the LEDs generate parallel coherent light beams that provide a stationary, single, and continuously appearing horizontal bar of light (illumination pattern) that illuminates the matrix code symbol 12. Such an illumination pattern (as well as the light in any other illumination pattern) of one embodiment used for image acquisition can be provided with substantially constant intensity throughout the illumination pattern, or at least have a sufficient light intensity level within the desired region of the illumination pattern that is to be placed over the matrix code symbol 12. Ambient light may be used to supplement the illumination pattern for such image acquisition embodiments, if necessary, to obtain a desired quality for the image to be acquired. In another embodiment that will be described later below, the shape, size, and/or intensity of the illumination pattern for image acquisition can be adapted based on certain conditions, such as the size of the target machine-readable symbol and/or the amount of ambient light that is present.

In an embodiment, one purpose of the aiming beam 14 is to assist the user in determining whether the data collection device 10 is optimally positioned in terms of orientation with respect to the matrix code symbol 12. For example, if the aiming beam 14 produces a rectangular linear illumination pattern, the degree of "tilt" of that illumination pattern about a major or horizontal axis of the matrix code symbol 12 can provide the user with an indication of the quality of the alignment of the data collection device 10 with respect to the matrix code symbol 12. The user can make necessary adjustments in the positioning of the data collection device 10 in order to change the tilt of the illumination pattern, from one direction to another, such that the illumination pattern is at substantially 0 degrees (or 180 degrees) relative to a major or horizontal axis of the matrix code symbol 12, thereby producing a satisfactory alignment.

In such an embodiment, another purpose of the aiming beam 14 is to illuminate the matrix code symbol 12 for image acquisition. That is, since the width and height of the illumination pattern encapsulates the surface area of the matrix code symbol 12, the illumination pattern provides the appropriate flood illumination on the matrix code symbol 12. An image sensor of the data collection device 10 can therefore receive and interpret the light returned from the matrix code symbol 12 to obtain the underlying data. In this embodiment, it is therefore no longer necessary to provide separate light sources for aiming and for flood illumination—the aiming beam 14 of the embodiment achieves both purposes. One advantage of this embodiment is that the elimination of the need to provide timing mechanisms and complex circuitry (or other intelligence) to deactivate an aiming beam prior to performing image acquisition to prevent interference with image acquisition, since the same beam 14 for target locating is also used for image acquisition. Another advantage is the elimination of the need for a separate illumination source itself and its associated structures and/or circuitry for reading the target symbol.

These and other techniques for imaging a 2D machine-readable symbol using the aiming beam 14 are further described with reference to FIG. 3. Such imaging techniques may also be used in conjunction with 1D machine-readable symbols, as will also be described in further detail below with reference to FIGS. 2 and 4.

Figure 1B:
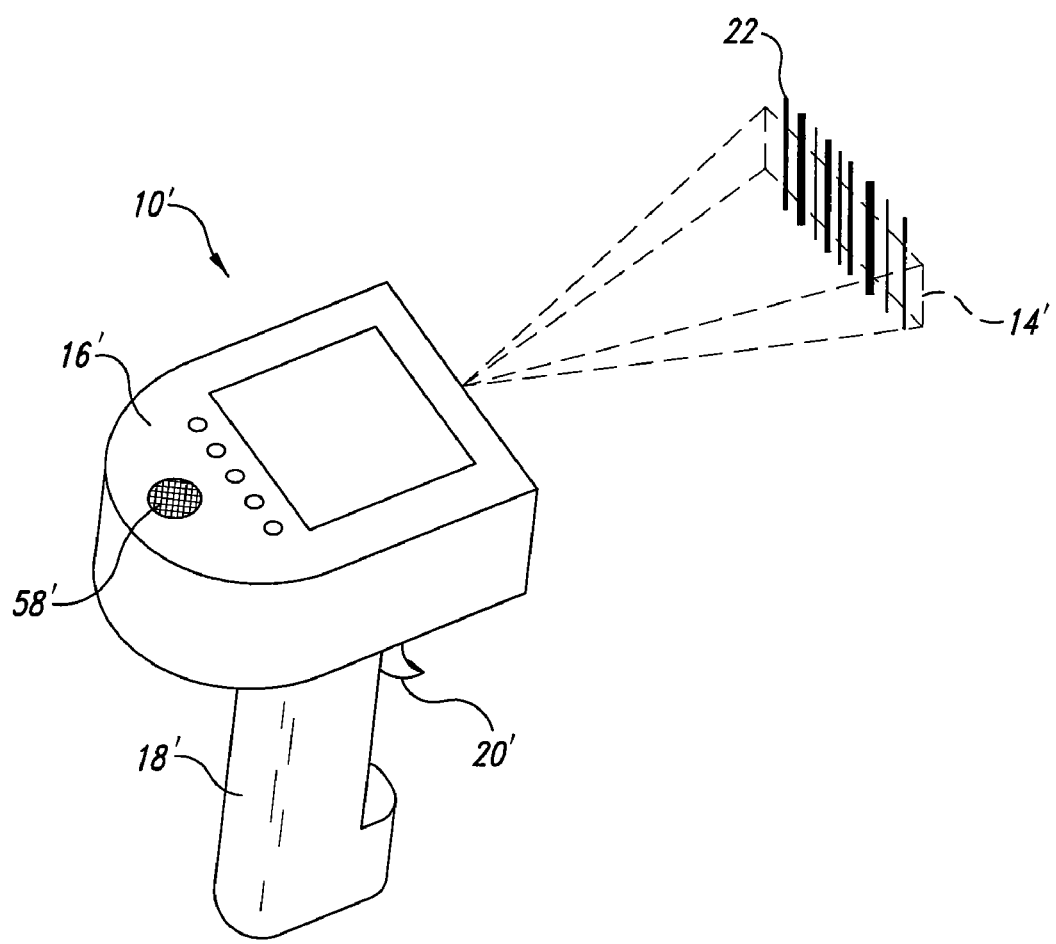
FIG. 1B is an upper isometric view of an embodiment of an automatic data collection device reading another target symbol with an aiming beam.

FIG. 1B illustrates an embodiment of another data collection device 10' that is usable to read 1D machine-readable symbols such as a barcode symbol 22. Throughout this description of various embodiments, the prime (') symbols will be used to identify similar components throughout the figures. The detailed description of such components are initially provided for embodiments where the non-primed components first appear, and for the sake of brevity, the description of such components in the context of their subsequently identified primed counterparts are abbreviated.

In FIG. 1B, the data collection device 10' can comprise the 2D data collection device 10 of FIG. 1A configured to a 1D mode (i.e., a multi-mode data collection device) to read 1D machine-readable symbols, or the data collection device 10' can comprise a dedicated 1D data collection device, such as a barcode reader. As with the embodiment of FIG. 1A, the data collection device 10' of FIG. 1B uses an aiming beam 14' for both target locating and data acquisition. The data collection device 10' can acquire data from a target 1D machine-readable symbol using imaging techniques.

In one embodiment, the aiming beam 14' produces a substantially linear illumination pattern having a major or horizontal axis. The illumination pattern an imaging area if the data collection device 10' uses imaging to acquire data from a 1D symbol. The illumination pattern of one embodiment is horizontal and stationary.

In an imaging implementation, the major axis of the illumination pattern defines a width of a field of view of the data collection device 10'. A minor axis, perpendicular to the major axis defines a height (thickness) of the field of view of the illumination pattern. The height can have a size that is less than or equal to the total height of the barcode symbol 22. That is, since the barcode symbol 22 is a 1D symbol, the encoded data is defined by the spacing and thicknesses of the bars in the barcode symbol 22 along its major or horizontal axis, while data is not encoded along its minor or vertical axis (as compared to a matrix code symbol or other 2D symbol). Since data is not encoded along the minor or vertical axis, the need to fully illuminate the barcode symbol 22 along its minor or vertical axis for image acquisition purposes is eliminated.

The aiming beam 14' of one embodiment can be generated by a plurality of light sources (such as LEDs or laser light sources) that produce light. These light sources can be arranged side by side in a linear direction, so as to provide a substantially elongated (e.g., horizontal) linear illumination pattern of substantially uniform intensity for image acquisition purposes. The illumination pattern can be stationary, and as will be described below for another embodiment, can have an adaptive shape, size, and/or intensity based on the conditions that are present when image acquisition is to be performed.

As with the aiming beam 14 of FIG. 1A, one purpose of the aiming beam 14' of FIG. 1B is for locating and positioning. Also, in addition to using the aiming beam 14' to aim the data collection device 10' at a target symbol, the illumination pattern of the aiming beam 14' can be used to provide an indication of alignment of the data collection device 10' relative to the barcode symbol 22. A "tilt" in the illumination pattern about the major or horizontal axis of the barcode symbol 22 provides a visual indicator to the user that the position of the data collection device 10' may need some adjustment in order to accurately read the target machine-readable symbol.

Another purpose of the aiming beam 14' is for data acquisition. That is, the barcode symbol 22 modulates the light returned back to the data collection device 10', which modulation represents the underlying data encoded in the barcode symbol 22. As indicated throughout this description, such data acquisition can be performed by either or both scanning and imaging. Therefore, prior to attempting to locate and decode a linear or two-dimensional symbol, a portion of the 2D sensor (such as an image array) aligned with and illuminated by the substantially linear aiming bean may be used to decode a linear symbol.

Figure 2:
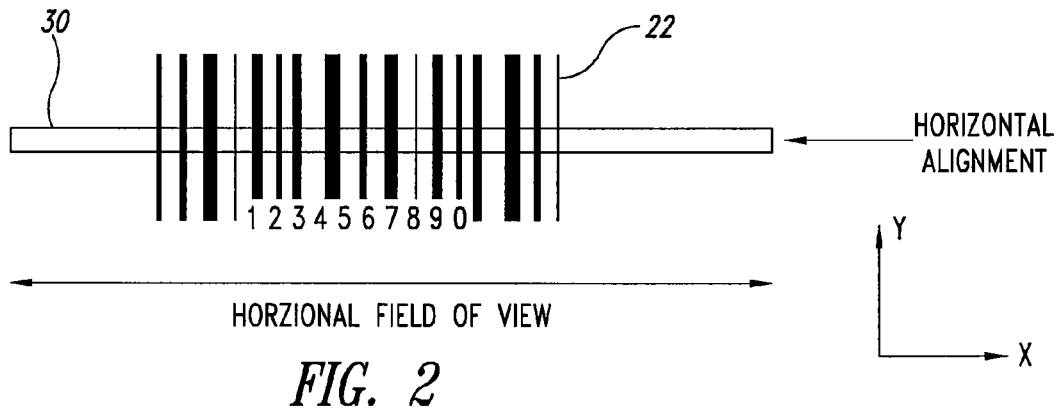
FIGS. 2-4 are front elevational views showing various example illumination patterns that can be generated by the aiming beam(s) of FIGS. 1A-1B.
Figure 3:
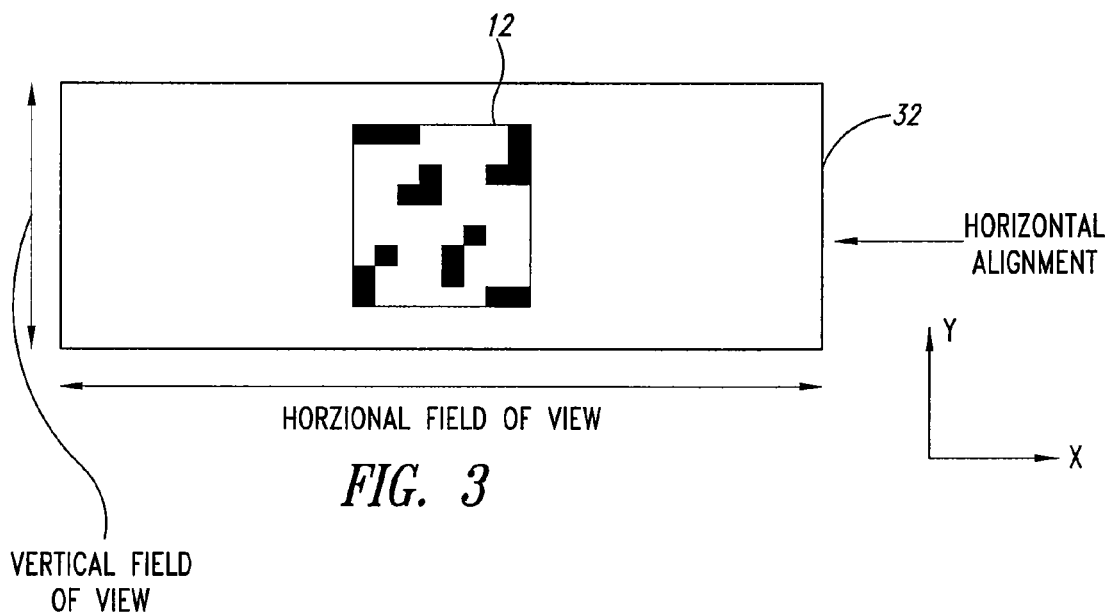
Figure 4:
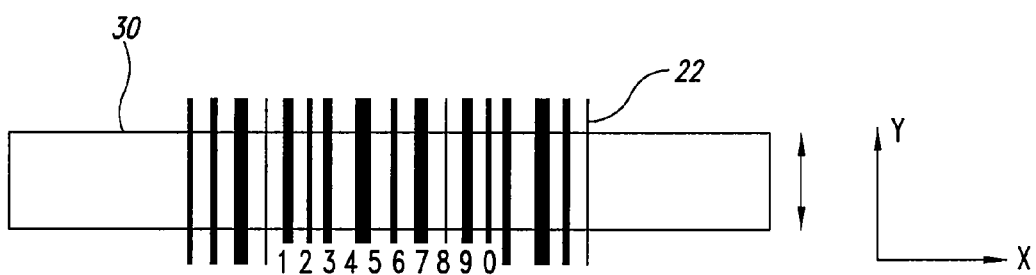

FIGS. 2-4 illustrate various illumination patterns that can be provided by embodiments. The illumination patterns are generated by the aiming beams 14 or 14', and can represent illumination for image acquisition of 1D and/or 2D machine-readable symbols.

In particular, FIG. 3 shows an example illumination pattern 32 generated by the aiming beam 14 for the matrix code symbol 12. If the matrix code symbol 12 or other 2D symbol is read using flood illumination, the illumination pattern 32 of one embodiment has a size and shape that fully illuminates all regions of the matrix code symbol 12, plus perhaps some of the surrounding exterior areas. In the specific example of FIG. 3, the width and height (thickness) of the illumination pattern 32 defines, respectively the horizontal field of view of the data collection device 10 along a major or X-axis and the vertical field of view of the data collection device 10 along a minor or Y-axis.

In an embodiment, the illumination pattern 32 is stationary and has a generally rectangular shape as shown in FIG. 3, which can be analogized to a "thick" linear horizontal illumination pattern. An advantage of such an embodiment is that some users may be more comfortable or familiar with using an aiming beam having a horizontal illumination pattern. Another advantage of such an embodiment is that the thick linear (e.g., rectangular) illumination pattern 32 can also be conveniently used for determining alignment and/or orientation. The user can more readily detect a "tilt" of the rectangular illumination pattern 32 about the X-axis, and can therefore make the proper orientation or alignment adjustments of the data collection device 10.

In an embodiment, the user positions the illumination pattern 32 over the matrix code symbol 12 such that the matrix code symbol 12 lies generally in the center of the illumination pattern 32, where the intensity of the illumination may be most optimum if the illumination pattern does not have uniform intensity. Thereafter, the image of the matrix code symbol 12 is acquired, and the image is decoded. The decoding process can also involve localization algorithms, which attempt to isolate or otherwise identify the specific image or portions thereof of the matrix code symbol 12 from other images, such as images of the background that surrounds the matrix code symbol 12, that may have been acquired during the image acquisition process. The localization algorithm can be applied to the sampled image data from the image array that captured the matrix code symbol 12.

The illumination pattern 32 of FIG. 3 can be generated using various techniques. One technique in an image acquisition embodiment is to arrange a plurality of coherent light sources in such a manner that they collectively flood illuminate the entire matrix code symbol 12 with stationary light beams when the data collection device 10 is pointed at the matrix code symbol 12. Such light sources can be arranged in rows and columns, for example, to produce the desired shape and size of the illumination pattern 32.

FIG. 2 shows an example illumination pattern 30 generated by the aiming beam 14' for the barcode symbol 22. The illumination pattern 30 has a width along a major or X-axis that defines the horizontal field of view of the data collection device 10' for imaging or scanning purposes. Since the barcode symbol 22 is linearly encoded with data along only the X-axis, the height (thickness along a minor or Y-axis) of the illumination pattern 30 need only be approximately the width of the thinnest bar or space in the barcode symbol 22.

As shown in FIG. 2, the width of the illumination pattern 30 (along the X-axis) of an embodiment can be generally longer than the length of the barcode symbol 22, such that the barcode symbol 22 can be substantially centered on the X-axis of the illumination pattern 30. Since the thickness of each individual bar and space of the barcode symbol 22 is substantially unchanged along the Y-axis (as is typical with barcode symbols), the illumination pattern 30 can be placed on upper or lower regions (along the Y-axis) of the barcode symbol 22 and not necessarily in its central region, and still result an accurate data acquisition.

FIG. 2 also illustrates use of the illumination pattern 30 for checking rotational alignment or orientation. In the illustrated embodiment, adequate rotational alignment or orientation exists if the illumination pattern is substantially perpendicular to the bars of the barcode symbol 22. If there is misalignment or improper orientation, the illumination pattern 30 will be tilted off the 0 and 180-degree axes, which would be a visual indicator to the user that rotational readjustment of the data collection device 10' may be needed before data acquisition is performed.

FIG. 4 is a view like FIG. 2, except that the illumination pattern 30 is thicker in height about the Y-axis. The thicker illumination pattern 30 of FIG. 4 can be used for image acquisition in a situation where it may be desirable to acquire a larger image portion of the barcode symbol 22. For example in FIG. 2, a thinner illumination pattern 30 can be used if the print quality of the barcode symbol 22 is relatively good. In an ideal decoding situation, just a single row of pixels on the image array can be sampled to retrieve the data encoded in the barcode symbol 22. Because fewer pixels are being sampled for decoding, a faster decoding process is obtained. In the embodiment of FIG. 4 in comparison, it may be desirable to acquire a larger image portion of the barcode symbol 22 if the print quality of the barcode symbol 22 is relatively poorer, due to distortion, printing anomalies, dirt, etc. If only a single row of pixel data is decoded, then erroneous results might be obtained, if the anomaly, distortion, dirt, etc. was located on the captured image portion. Therefore, acquiring a relatively larger image portion of the barcode symbol 22 about the minor or Y-axis ensures that multiple rows of pixel data can be decoded and analyzed for accuracy/consistency. A relatively longer decoding process may be the consequence of this, but increased accuracy is a benefit.

A technique to obtain the effect of FIG. 4 for image acquisition purposes is to use a plurality of light sources to generate a stationary illumination pattern 30, for example by using a row of vertically stacked coherent light sources. Such light sources flood illuminate at least some of the relevant regions of the barcode symbol 22 to allow acquisition of the illuminated image, using a CCD for instance, and the resulting acquired image is decoded to obtain the encoded data. The number of light sources along the X-axis determines the horizontal field of view, while the number of light sources about the Y-axis determines the vertical field of view. Alternatively or additionally, the amount of divergence of the light beams from the light sources can also determine or imply the horizontal and/or vertical fields of view.

Figure 5:
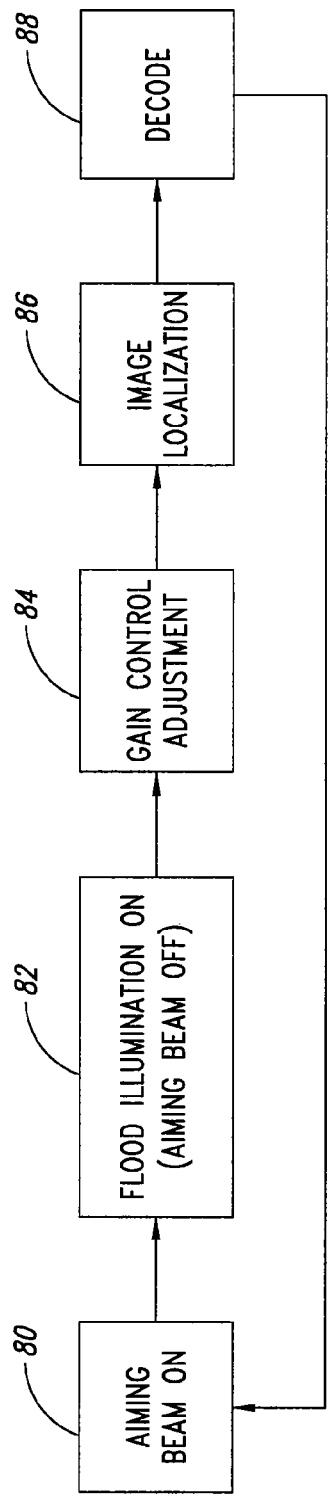
FIG. 5 is a flow diagram of a typical image acquisition process.

FIG. 5 illustrates at least some of the operations that may ordinarily be involved during image acquisition of 2D machine-readable symbols, including turning an aiming beam ON, turning OFF the aiming beam and turning ON a flood illumination, gain control adjustment, image localization, and image decoding, at blocks 80-88 respectively. However, for embodiments of the data collection device 10' that use of the aiming beam 14' for both target locating and image acquisition of a 1D machine-readable symbol as described above with reference to FIGS. 2 and 4, a much simpler process is provided and is shown in FIG. 6.

Figure 6:
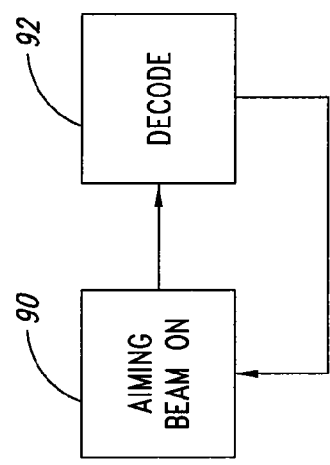
FIG. 6 is a flow diagram of an image acquisition process according to an embodiment.

In particular, by using the aiming beam 14' for both target locating and target illumination for image acquisition, the target locating and target illumination performed separately at the blocks 80 and 82 of FIG. 5 can be performed in substantially a single block 90 in FIG. 6. Other operations shown in FIG. 5, specifically the image localization in the block 86, can be eliminated in the process of FIG. 6, which results in a simpler decoding at a block 92. Gain control adjustment or other adjustment (such as increasing the illumination) may be performed as needed to provide adequate image quality.

The image localization at the block 86, which is normally performed during typical image acquisition of 2D machine-readable symbols, can be eliminated in the process for acquiring images of 1D machine-readable symbols in FIG. 6. That is, the vertical field of view of the illumination pattern 30 is not sufficiently large to overlap into non-data carrying regions above and below the barcode symbol 22 during image acquisition. As discussed above, the linear barcode symbol 22 only stores data along its major or X-axis, and therefore it is not necessary to fully illuminate the barcode symbol 22 along its entire minor or Y-axis in order to obtain the underlying data, which accordingly leads to a reduced or eliminated need to separate the desired image from background images along the minor or Y-axis in a subsequent image localization operation.

Also, the vertical field of view of the illumination pattern 30 need not capture the entire image of the barcode symbol 22 along the Y-axis. Thus, since only a portion of the barcode symbol 22 is being acquired along the Y-axis, the image array will have the useful data confined to relatively few rows (just one row in an ideal situation) in the central region of the image array. The image array can be sampled at just the row(s) having the useful data, without having to sample the entire image array, therefore leading to a faster decoding process.

In an embodiment, the illumination patterns 30 and/or 32 of FIGS. 2-4 can be adaptively changed in terms of shape, size, and/or light intensity based on certain conditions. For instance, there may be a need for a narrower but more intense illumination and/or a need for a more visible aiming beam.

Beginning first with the illumination pattern 32 of FIG. 3, the illumination pattern 32 can be shaped and/or sized so as to fully illuminate the matrix code symbol 12 or other machine-readable symbol having a relatively larger size as compared to a smaller machine-readable symbol. In the matrix code symbol embodiment of FIG. 3, the illumination pattern 32 can be shaped and/or sized so that the illumination pattern 32 extends just past the boundaries of the matrix code symbol 12 in at least one dimension, or as described previously in an embodiment above, the illumination pattern 32 can have a shape and size that represents a substantially horizontal rectangular illumination pattern wherein the illumination pattern 32 extends further past the left/right side boundaries of the matrix code symbol 12 as compared to the top/side boundaries. In other embodiments, the illumination pattern 32 can be shaped such that the illumination pattern 32 substantially does not extend past the boundaries of the matrix code symbol 12 (either or both horizontal and vertical boundaries of the matrix code symbol 12).

Further in an embodiment, the size and shape of the illumination pattern can be adaptively changed if a target machine-readable symbol of the same type is to be read. For instance, after reading the specific matrix code symbol 12 of FIG. 3, the data collection device 10 may need to read another target matrix code symbol that has a larger size. In such a situation, a lens system of the data collection device 10 can reshape and/or resize the illumination pattern 32 so as to accommodate the subsequent target matrix code symbol.

A smaller illumination pattern can be provided for relatively smaller target machine-readable symbols, such as a 1D machine-readable symbol and/or a smaller 2D machine-readable symbol. For example in FIG. 4, the illumination pattern 32 of FIG. 3 can be focused into a narrower (thinner) but much brighter illumination pattern 30 for imaging the barcode symbol 22, which may be relatively smaller in size compared to the matrix code symbol 12. The brighter illumination pattern 30 ensures that the smaller barcode symbol 22 can be adequately located and imaged by the user.

In some situations, the imaging environment may be "bright" if there is a large amount of ambient light, for example. In such a situation, additional illumination for imaging may not be required—however, it may be difficult for the user to see an aiming beam due to the bright environment. Therefore, one embodiment of the data collection device 10 (and/or the data collection device 10') uses the illumination pattern 30 or 32 to supplement any existing aiming beam and/or to provide a focused aiming beam, and then turns OFF the illumination pattern 30 or 32, if necessary, when image acquisition is performed.

Further in an embodiment, if two or more light sources are used to provide illumination for imaging, such light sources can be used to provide one or more aiming beams as well. That is, beam convergence or other technique usable with the plurality of light sources can be used to visually indicate the ideal distance to the target machine-readable symbol.

Figure 7:
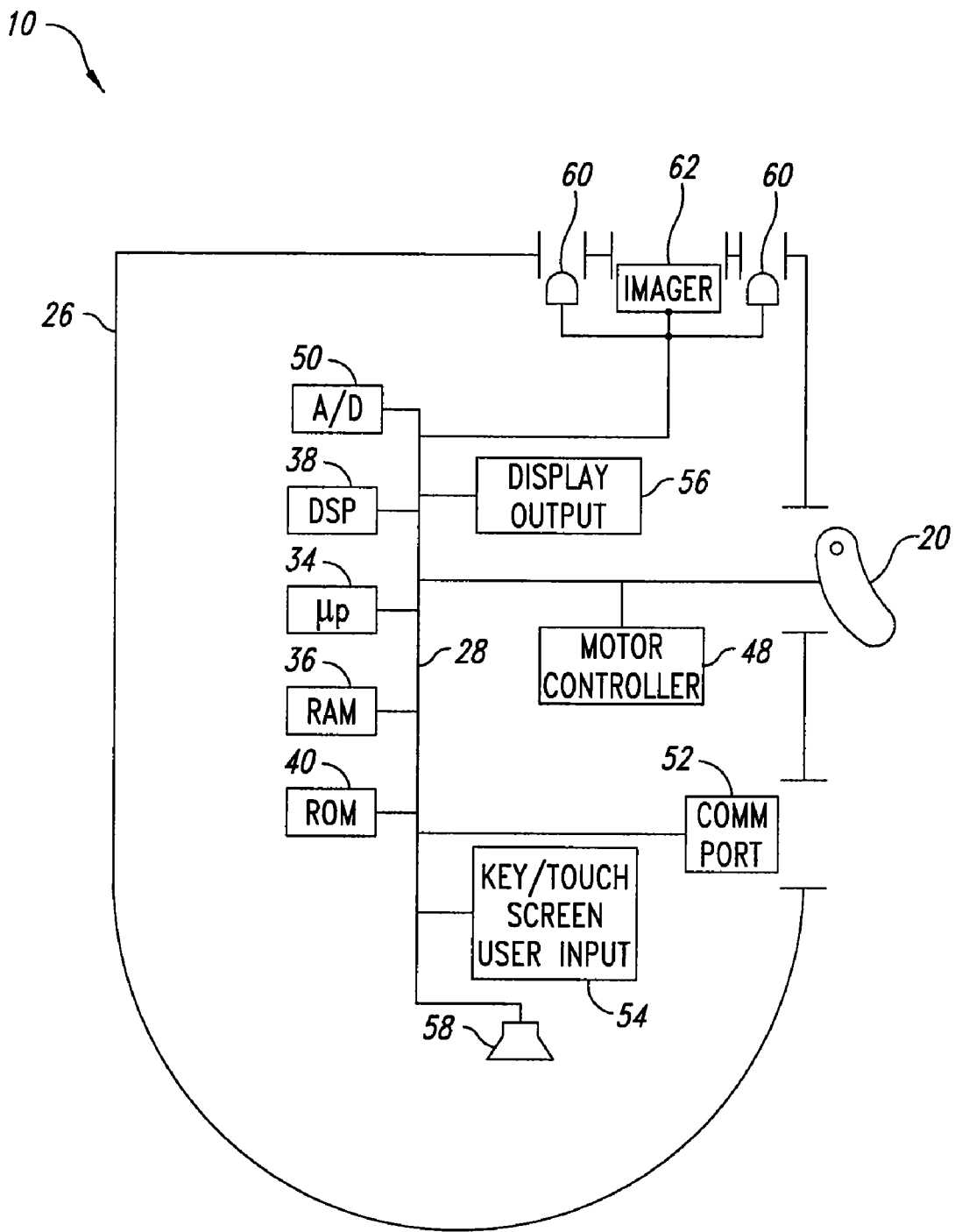
FIG. 7 is a functional block diagram of an embodiment of a data collection device corresponding to FIG. 1A.
Figure 8:
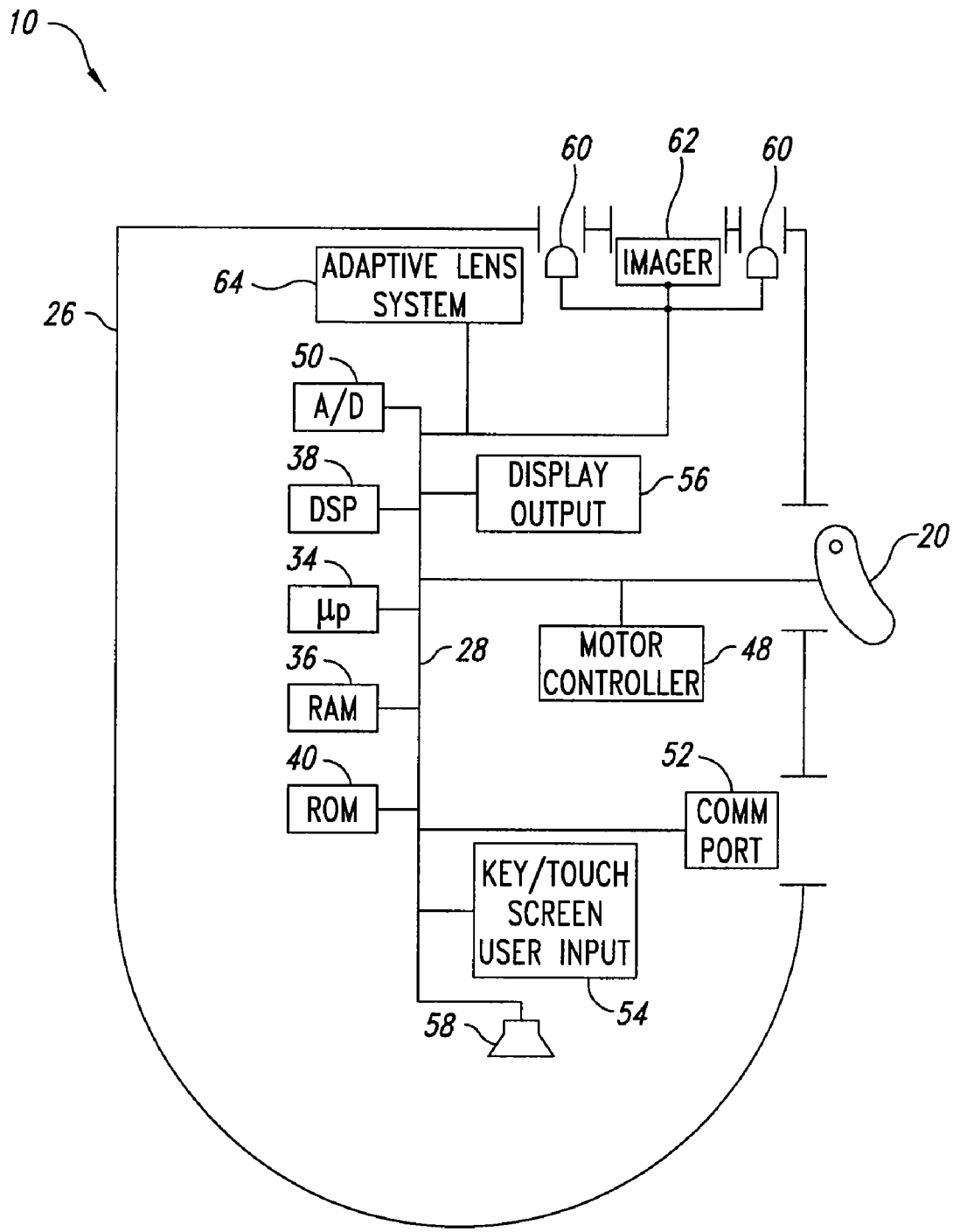
FIG. 8 is a functional block diagram of an embodiment of a data collection device having an adaptive lens system that can change a size, shape, and/or intensity of an illumination pattern.

FIGS. 7 and 8 are block diagrams of embodiments of the data collection device 10 (or 10') having the features described above, and particularly a data collection device 10 (or 10') having an adaptive lens system in FIG. 8. While such block diagrams depict dedicated 2D and/or 1D data collection devices that use imaging, such embodiments are illustrated and described in this manner only for convenience and clarity. The features depicted in the illustrated embodiments can be suitably combined into a single device and can be further supplemented with other components, so as to provide a multi-mode data collection device that is capable to read any one or more of 1D, 2D, or other type of machine-readable symbols using imaging or scanning, and which may additionally read other types of automatic data collection (ADC) data carriers, including RFID and acoustical data carriers, for example. For the sake of simplicity of explanation hereinafter, the description of the embodiments will be provided in the context of the data collection device 10—it is appreciated that such description can also be applied appropriately to the data collection device 10'.

As shown in the embodiment of FIG. 7, the data collection device 10 has a housing 26 that carries various components, symbolically shown as being coupled together via a bus 28. The bus 28 provides data, commands, and/or power to the various components of the data collection device 10. The data collection device 10 can include an internal power source such as a rechargeable battery (not shown), or can receive power from an external power source such as a wall outlet by way of an electrical cord (not shown).

The data collection device 10 includes at least one flood illumination source 60, such as a plurality of light sources, to substantially illuminate a target symbol such as the matrix code symbol 12. The flood illumination source 60 also generates the aiming beam 14 of FIG. 1A, which for example produces the illumination pattern 32 of FIG. 3. The flood illumination source 60 can be in the form of one or more laser light sources, LED light sources, or other suitable type of light source(s) that can be used for target locating and target illumination in the manner previously described above.

A motor controller 48 can be provided for a variety of purposes. The motor controller 48 can control movement of the illumination source(s) 60 and/or can control movement of a reflective mirror (or other mechanical or optical element) that focuses the illumination onto the target region, for example. The motor controller 48 can also be used to control a mirror (or other mechanical or optical element) to focus the returned light onto an imager or image detector 62 or other image array.

The image detector 62 is positioned to receive illumination returned from the target symbol during image acquisition of the matrix code symbol 12, barcode symbol 22, or other symbol. The image detector 62 can take the form of a one- or two-dimensional charge coupled device (CCD) array, for example, or other suitable image sensor or image array. The image detector 62 of various embodiments can implement linear imagers, 2D imagers, or other types of imagers usable with a variety of light sources. In certain embodiments, the data collection device 10 can omit or reduce the output of the illumination source 60 for purposes of image acquisition, for example where the image detector 62 is a two-dimensional CCD array operable with ambient light.

The data collection device 10 of FIG. 7 includes at least one microprocessor, controller, microcontroller, or other processor, which are symbolically shown as a single microprocessor 34. It is appreciated that the data collection device 10 may include separate dedicated processors for reading and processing matrix code symbols, RFID tags, acoustical tags, barcode symbols, other data carriers, and the like, as well as one or more processors for controlling operation of the data collection device 10.

Moreover, in one example embodiment at least one digital signal processor (DSP) 38 may be provided to cooperate with the microprocessor 34 to process signals and data returned from the symbols. Such signal processing may be performed for purposes of reading data from signals received from the target symbol. For instance during decoding, the DSP 38 can perform image processing to extract the underlying data from the captured image of the matrix code symbol 12 or the barcode symbol 22.

Alternatively or additionally, the microprocessor 34 can execute software or other machine-readable instructions stored in a machine-readable storage medium in order to perform the decoding or to otherwise control operation of the data collection device 10. Such storage medium can be embodied by a random access memory (RAM) 36, a read only memory (ROM) 40, or other storage medium. The software stored in the storage medium can include a decoding algorithm.

In an embodiment, the ROM 40 stores instructions for execution by the microprocessor 34 to operate the various components of the data collection device 10. For example, the ROM 40 contains instructions for the microprocessor 34 that permit the microprocessor 34 to control the image detector 62 to capture image data and to decode and/or manipulate the captured image data. As used in this herein, ROM includes any non-volatile memory, including erasable memories such as EEPROMs.

The RAM 36 is provided to temporarily store data, such as a captured image data from the image detector 62. The RAM 36 can also store other types of data, such as variable values, results of calculations, state data, or other information.

An analog-to-digital (A/D) converter 50 can be used if necessary to transform various analog electrical signals to digital form, such as communication signals or user input signals. The bus 28 couples the digital data from the A/D converter 50 to the microprocessor 34 and the RAM 36.

Symbol reading and decoding technology is well known in the art and will not be discussed in further detail. Many alternatives for image sensors, symbol decoders, and optical elements that can be used in the data collection device 10 are taught in the book, The Bar Code Book, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763, issued Sep. 11, 2001, and assigned to the same assignee as the present application.

The data collection device 10 can include a communication port 52 to provide communications to external devices. The communication port 52 can be a hardwire or wireless interface, and can even employ an antenna, radio, USB connection, Ethernet connection, modem, or other type of communication device. The communication port 52 can provide communications over a communications network (not shown) to a host (not shown), allowing transmissions of data and/or commands between the data collection device 10 and the host. The communications network can take the form of a wired network, for example a local area network (LAN) (e.g., Ethernet, Token Ring), a wide area network (WAN), the Internet, the World Wide Web (WWW), wireless LAN (WLAN), wireless personal area network (WPAN), and other network. Alternatively or additionally, the communications network can be a wireless network, for example, employing infrared (IR), satellite, and/or RF communications.

The data collection device 10 includes a keypad, mouse, touch screen, or other user input device 54 to allow user input. It is appreciated that other devices for providing user input can be used. The user input device 54 is usable to allow the user to select modes (e.g., modes for reading matrix code symbols, barcode symbols, or other symbols), turn the data collection device 10 ON/OFF, adjust power levels, and others. The bus 28 couples the user input device 54 to the microprocessor 34 to allow the user to enter data and commands.

The bus 28 also couples the trigger 20 to the microprocessor 34. In response to activation of the trigger 20, the microprocessor 34 can cause the illumination source 60 to emit light for target locating. A subsequent or additional pressing of the trigger 20 can be used to activate image acquisition.

The data collection device 10 includes human-perceptible visual (e.g., a display output) and audio indicators 56 and 58 respectively. The bus 28 couples the visual and audio indicators 56 and 58 to the microprocessor 34 for control thereby. The visual indicators 56 take a variety of forms, for example: light emitting diodes (LEDs) or a graphic display such as a liquid crystal display (LCD) having pixels. These or other visual indicators can also provide other data associated with the operation of the data collection device 10, such as visual indicators to indicate whether the data collection device 10 is ON/OFF, reading, interrogating, low on battery power, successful or unsuccessful reads/interrogations, and so forth.

The audio indicator 58 can take the form of one or more dynamic, electrostatic or piezo-electric speakers, for example, operable to produce a variety of sounds (e.g., clicks and beeps), and/or frequencies (e.g., tones), and to operate at different volumes. Such sounds can convey various types of information, such as whether a symbol was successfully or unsuccessfully read, low battery power, or other information.

The embodiment of FIG. 8 is similar to the embodiment of FIG. 7, except with the added feature of an adaptive lens system 64. The adaptive lens system 64 of FIG. 8 is usable to change the shape, size, and/or intensity of the illumination pattern on the target machine-readable symbol. Alternatively or additionally, the microprocessor 34 can control the output level of the light sources 60, thereby changing the intensity of the illumination pattern without necessarily having to change a lens configuration.

In an embodiment, the microprocessor 34 can control the lens assembly 64 to change the shape, size, and/or intensity of the illumination pattern. For instance, the microprocessor 34 can analyze the size and/or shape of the image on the image detector 62 and then determine that a change in lens configuration is needed in order to adequately illuminate the required portions of the target machine-readable symbol.

In such an embodiment, the lens system 64 can comprise one or more lenses placed in front of the illumination sources 60 that can be selectively repositioned, supplemented with additional lens(es), have len(es) deleted, or otherwise modified in order to provide an illumination pattern having the desired size, shape, and/or intensity. The lens system 64 can include static or dynamic lens systems that provide this functionality. An example dynamic lens system comprises a photochromic lens or other adaptive system that can change shading/darkness level based on the level of ambient light and/or in response to electrical fields or other electrical control, thereby providing a control over the intensity of the light that is incident on the target machine-readable symbol. The microprocessor 34 can further cooperate with the motor controller 48 to electromechanically control the selection and/or positioning of lenses in order to obtain the desired effect.

Example techniques to change the intensity of illumination, as well as providing autofocus capability and/or other capabilities, are disclosed in U.S. patent application Ser. No. 11/040,485, entitled "AUTOFOCUS BARCODE SCANNER AND THE LIKE EMPLOYING A MICRO-FLUIDIC LENS," filed Jan. 20, 2005, assigned to the same assignee as the present application, and incorporated herein by reference in its entirety.

Various other beam shaping techniques can be used to provide the desired shape and/or size of the illumination pattern. Manual techniques can be provided in an embodiment alternatively or in addition to automatic techniques that use the microprocessor 34. In such manual techniques, the user can manually adjust the adaptive lens system 64 (and/or the power level to the illumination sources 60), to change the shape, size, and/or intensity of the illumination pattern. Moreover, while coherent light sources for the aiming beams have been described in some embodiments, other embodiments may use light sources that generate diverging beams of light.

All of the above U.S. patents, U.S. patent application publications, U.S. patent applications, foreign patents, foreign patent applications and non-patent publications referred to in this specification and/or listed in the Application Data Sheet, are incorporated herein by reference, in their entireties.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, specific shapes of the illumination patterns 30 and 32 have been shown and described. These illumination patterns are merely illustrative of some example shapes and sizes of illumination patterns that can be generated, and are provided herein for the purpose of ease of explanation and illustration. Such illumination patterns are not intended to be restrictive.

As another example, FIG. 2 shows a linear barcode symbol 22, while FIG. 3 shows a matrix code symbol 12. An embodiment can be provided wherein a horizontal alignment beam similar to that shown in FIG. 2 can be used with the two-dimensional symbol matrix code symbol 12 of FIG. 3, which demonstrates that the horizontal alignment beam can be used to locate but not decode 2D machine-readable symbols.

These and other modifications can be made in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method usable with an imager automatic data collection device having a two-dimensional field of view, the method comprising:
producing a stationary aiming beam having a wavelength in a visible portion of an electromagnetic spectrum and having at least one dimension that corresponds to a dimension of the field of view of the imager automatic data collection device;
illuminating at least a portion of a target machine-readable symbol with the stationary aiming beam;
receiving at least a portion of light of the stationary aiming beam that has been returned from the illuminated area of the target machine-readable symbol;
adaptively changing at least one of a shape, size, or intensity of an illumination pattern produced by the stationary aiming beam on the target machine-readable symbol based on at least one of a size of the target machine-readable symbol, a shape of the target machine-readable symbol, and a brightness level of ambient light; and
decoding information modulated in the returned and received light.

2. The method of claim 1 wherein the stationary aiming beam comprises a stationary aiming beam that can be positioned horizontally relative to a major axis of the target machine-readable symbol.

3. The method of claim 1 wherein illuminating at least a portion of a target machine-readable symbol with the stationary aiming beam includes illuminating at least a portion of a 2D machine-readable symbol.

4. The method of claim 1 wherein illuminating at least a portion of a target machine-readable symbol with the stationary aiming beam includes illuminating at least a portion of a 1D machine-readable symbol.

5. The method of claim 4 wherein decoding information modulated in the returned light includes obtaining the information from less than an entire portion of an image detector that captures the returned light.

6. The method of claim 1 wherein if the brightness level of the ambient light is sufficient for illuminating the target machine-readable symbol for imaging, the stationary aiming beam is used for aiming and deactivated during imaging.

7. The method of claim 1 wherein illuminating the target machine-readable symbol includes using a plurality of light sources and a beam convergence technique to provide the stationary aiming beam and to visually indicate an optimum distance from the data collection device to the target machine-readable symbol.

8. The method of claim 1 wherein producing the stationary aiming beam having at least one dimension that corresponds to a dimension of the field of view of the automatic data collection device includes producing the aiming beam with first and second dimensions along major and minor axes, respectively, that correspond to dimensions along major and minor axes of the field of view.

9. An automatic data collection apparatus, comprising:
at least one light source to generate a human-perceptible stationary light, with respect to the automatic data collection apparatus, that produces a human-perceptible indication of at least one dimension of an illuminated area of a target machine-readable symbol to be imaged;
a sensor to detect a portion of the human-perceptible stationary light that is returned from the target machine-readable symbol, the detected light being modulated by at least a portion of the target machine-readable symbol, the sensor being capable to produce signals indicative of the modulation;
an adaptive lens system to change at least one of a shape, size, or intensity of an illumination pattern generated by the light source based on at least one of a size of the target machine-readable symbol, a shape of the target machine-readable symbol, and a brightness level of ambient light; and
a processor coupled to the sensor to process the signals to obtain data encoded in the target machine-readable symbol.

10. The apparatus of claim 9 wherein the target machine-readable symbol comprises a 1-dimensional machine-readable symbol.

11. The apparatus of claim 9 wherein the target machine-readable symbol comprises a 2-dimensional machine-readable symbol.

12. The apparatus of claim 9 wherein the at least one light source comprises a plurality of lights sources that generate stationary light beams that collectively produce an illumination pattern that illuminates the area of the target machine-readable symbol.

13. The apparatus of claim 9 wherein the human-perceptible light produces an illumination pattern that defines major and minor axial fields of view for either or both imaging and scanning performed by the human-perceptible light, the apparatus further comprising a two-dimensional image detector.

14. The apparatus of claim 9, further comprising a decode algorithm to decode the signals, which represent a captured image corresponding to a 1-dimensional machine-readable target symbol, substantially without using an image localization process.

15. An article of manufacture, comprising:
a machine-readable medium usable with an automatic data collection device and having instructions stored thereon to allow a processor to obtain data provided by a target machine-readable symbol, by:
controlling illumination of at least a portion of a target machine-readable symbol with an illumination pattern generated by a human-perceptible aiming beam, the aiming beam being stationary with respect to the automatic data collection device, the illumination pattern being usable to provide a human-perceptible indication of at least one dimension of the target machine-readable symbol;
adaptively changing at least one of a shape, size, or intensity of the illumination pattern based on at least one of a size of the target machine-readable symbol, a shape of the target machine-readable symbol, and a brightness level of ambient light; and
reading the target machine-readable symbol using the illumination pattern generated by the aiming beam.

16. The article of manufacture of claim 15 wherein the instructions for reading the target machine-readable symbol include instructions for imaging at least a portion of a target 1-dimensional (1D) machine-readable symbol, wherein the machine-readable medium further includes instructions stored thereon to allow the processor to obtain data encoded by the target 1D machine-readable symbol by decoding the imaged target 1D machine-readable symbol substantially without applying an image localization process.

17. The article of manufacture of claim 15 wherein the instructions for controlling the illumination include instructions to provide the illumination pattern with dimensions that define major and minor axial fields of view of the data collection device.

18. The article of manufacture of claim 15 wherein the machine-readable medium further includes instructions stored thereon to decode sampled data from a portion of an image array that has encoded data from the target machine-readable symbol, rather than decoding from the entire image array.

19. An automatic data collection apparatus, comprising:
at least one light source arranged to emit from the automatic data collection apparatus a human-perceptible flood illumination of at least one dimension of an illuminated area of a target machine-readable symbol to be imaged;
an image sensor arranged to detect at least a portion of the human-perceptible flood illumination that is returned from the illuminated area of the target machine-readable symbol, the detected light being modulated by at least a portion of the target machine-readable symbol, the sensor being capable to produce signals indicative of the modulation;
an adaptive lens system arranged to change at least one of a shape, size, or intensity of a human-perceptible flood illumination pattern generated by the light source based on a brightness level of ambient light; and
a processor coupled to the sensor to process the signals to obtain data encoded in the target machine-readable symbol.

20. The apparatus of claim 19 wherein the target machine-readable symbol comprises a 1-dimensional machine-readable symbol.

21. The apparatus of claim 19 wherein the target machine-readable symbol comprises a 2-dimensional machine-readable symbol.

22. The apparatus of claim 19 wherein the at least one light source comprises a plurality of lights sources that generate respective light beams that collectively produce the human-perceptible flood illumination pattern that illuminates the area of the target machine-readable symbol.

23. The apparatus of claim 19 wherein the image sensor is a two-dimensional image detector.

24. The apparatus of claim 19, further comprising a decode algorithm to decode the signals, which represent a captured image corresponding to a 1-dimensional machine-readable target symbol, substantially without using an image localization process.

* * * * *